United States Patent [19]
Brunet et al.

[11] Patent Number: 5,261,477
[45] Date of Patent: Nov. 16, 1993

[54] PROCESS FOR PRODUCING PARTS WITH AN ABRASION-PROOF SURFACE

[75] Inventors: Pierre Brunet, Saint Pierre D'Albigny; Guy Maybon; Gérard Pizzini, both of Saint Jorioz, all of France

[73] Assignee: Technogenia S.A. société anonyme, Saint Jorioz, France

[21] Appl. No.: 769,455

[22] Filed: Oct. 1, 1991

[30] Foreign Application Priority Data

Oct. 11, 1990 [FR] France ................ 90 12713

[51] Int. Cl.⁵ ................ B22D 19/14; B22D 23/06
[52] U.S. Cl. ................ 164/97; 164/80; 164/71.1
[58] Field of Search ................ 164/71.1, 80, 97, 98

[56] References Cited

U.S. PATENT DOCUMENTS

| | | | |
|---|---|---|---|
| 1,547,836 | 7/1925 | Steenstrup | 164/97 |
| 4,947,942 | 8/1990 | Morita et al. | 164/97 |
| 5,000,273 | 3/1991 | Horton et al. | 164/97 |
| 5,020,584 | 6/1991 | Aghajanian et al. | 164/97 |

FOREIGN PATENT DOCUMENTS

| | | | |
|---|---|---|---|
| 0033065 | 2/1984 | Japan | 164/97 |
| 0003864 | 1/1987 | Japan | 164/97 |

*Primary Examiner*—Mark Rosenbaum
*Assistant Examiner*—Erik R. Puknys
*Attorney, Agent, or Firm*—William H. Eilberg

[57] ABSTRACT

The process according to the invention involves using an infiltration technique with a binder metal 16 in a layer filled with grains of melted tungsten carbide 15, the layer being arranged between the walls of a mould 13 and a core 2, the walls of the mould being made of foundry sand bonded by resins. The invention makes it possible to reduce the cost of the infiltration process.

14 Claims, 4 Drawing Sheets

PROCESS FOR PRODUCING PARTS WITH AN ABRASION-PROOF SURFACE

BACKGROUND OF THE INVENTION

1. Field of the Invention

The present invention relates to the manufacture of composite metal parts which have a contact surface intended to withstand abrasion.

2. Description of the Prior Art

So-called mechanical "wearing" parts are known which are superficially reinforced by adding a material which has improved properties in terms of resistance to wear by abrasion.

Means commonly used to obtain a reinforced contact surface include techniques of adding hard alloys by welding. These techniques are usually referred to by engineers as "hardfacing".

The present invention relates in particular to hardfacings which use a structure of extremely hard grains which are bonded to each other by a metal alloy, commonly referred to as a metallic matrix.

Hardfacing by welding may use a wide variety of processes and materials. It is convenient to use hardfacing with a tungsten carbide or other extremely hard material base. For instance, rigid or flexible welding rods are used; one end is applied to the surface to be hardfaced and is then subjected to an electric arc or an oxy-acetylene flame. The welding rod contains tungsten carbide powder mixed with a nickel-based alloy or other appropriate metals.

Such hardfacing using tungsten carbide based welding rods has a certain number of drawbacks.

In particular, welding processes mean that the hardfacing is deposited in the form of successive side-by-side beads. It is obvious that producing a relatively large surface area using such a technique is time-consuming and requires a certain amount of skill and dexterity on the part of the operator.

The waves inherent in such a deposition process in the form of successive beads cause irregularities in thickness which may be as much as several millimeters. As a result, this technique cannot be used to produce parts having accurate dimensions. In addition, this technique cannot be used to produce parts which have complex shapes, e.g. those that have grooves and ribs, hollows, sharp edges. Welding irregularities are greater if the parts to be hardfaced have complex shapes.

A process is known from document EP-A-0 123 961 which is similar to traditional casting processes: in the initial stage, a molten binder metal is poured into a cold sand mould; in a subsequent stage, a hard powder is sprinkled onto the molten metal in the mould, drops to the bottom of the mould and forms the hard layer which is continuously bonded to the upper layer of molten alloy. Such a process is difficult to use and does not make it possible to control the density and shape of the abrasion-proof layer thus produced.

Document GB-A-2 003 932 also discloses a moulding process by melting powder in a mould. The moulds described in this document are made of graphite or a molybdenum alloy.

In document FR-A-2 160 117, a process has been disclosed to coat internally a cylinder by centrifugal moulding. The cylinder is filled with a binder alloy and particles of a hard material. This assembly is heated to a high temperature in a furnace. At the start of cooling, the cylinder is rotated at high speed to force the hard particles to move outwards in the direction of the cylinder wall. After cooling, the inside of the cylinder is machined to obtain the desired diameter.

Processes for producing a layer of a composite abrasion-proof material which use infiltration techniques are also known, e.g. the technique described in French patents FR-A-1 398 732 and FR-A-2 352 890. These techniques use a cavity mould made of carbon or a ceramic material which has the desired shape; a core is placed in the cavity of the mould opposite the walls of the mould; the internal space between the core and the walls of the mould is filled with grains of tungsten carbide or equivalent and the assembly is vibrated to compact the grains; grains or pellets of binder metal or alloy are placed on top of the tungsten carbide grains; the assembly is heated to a temperature which exceeds the melting point of the alloy but is less than the melting point of the core and the mould: this increase in temperature melts the binder alloy or metal which spreads into the space filled with tungsten carbide grains and welds with the core if the latter is made of metal. The assembly is allowed to cool before stripping.

This infiltration technique is relatively suitable for parts which have flat abrasion-proof surfaces. The mould can then be produced at low cost without requiring complicated machining. In contrast, the process is totally inappropriate for producing parts which have a non-flat abrasion-proof surface, i.e. a surface which has grooves and ribs. Producing a ceramic or carbon mould is a much too complex and expensive operation and means that this process cannot be used industrially.

SUMMARY OF THE INVENTION

One of the main objects of the present invention is to avoid the drawbacks of known processes by proposing a new infiltration process which can be employed using relatively inexpensive means, thus making it unnecessary to use expensive ceramic or carbon moulds.

One object of the invention is to apply this new technique to the production of parts having a non-flat abrasion-proof surface which may have considerable surface irregularities such as ribs, grooves or any other shape which can conventionally be obtained by moulding.

For instance, the invention aims to apply these new techniques to produce abrasion-proof surfaces by infiltration in order to manufacture special parts and, in particular, tubes with an internal abrasion-proof surface or plates for grinders. Such grinder plates have ribs and grooves and are used to defibrate or refine paper pulp or to grind ceramic materials. These applications involve a significant and surprising increase in the quality and efficiency of devices produced in this way.

The process for producing a surface according to the invention involves the following successive stages:

a cavity mould is prepared which has mould walls having the same shape as the abrasion-proof surface to be produced, particles of hard material such as melted tungsten carbide are introduced into the mould cavity and the assembly is vibrated so that the surface particles come into as close as possible contact with the walls of the mould and are contiguous with each other, a sufficient quantity of an appropriate alloy in a suitable form is prepared to ensure subsequent distribution of the alloy during the later melting phase; the alloy being a soldering alloy capable of wetting the particles of hard material and melting at a temperature which is less than the melting point of the particles of hard material and the mould, the assembly is heated to a temperature which exceeds the melting point of the alloy but is less than the melting point of the hard material and the mould, this temperature is maintained for a sufficient time to ensure infiltration of the molten alloy into the space filled with particles of hard material, the assembly is allowed to cool and the mould is stripped.

The present applicant has succeeded to a surprising extent in employing such an infiltration process by using a mould made of foundry sand, i.e. a sand mould bonded by a 2-component organic resin of a type conventionally used for casting purposes. This result is particularly surprising insofar as foundry sand moulds, which are usually used for shell mould casting (croning process), which involves pouring a molten metal into the mould to give the metal the shape of the part to be produced, require the use of a mould which is cold at the moment the metal is poured. In fact the sand mould is bonded by a resin which is liable to disintegrate if the temperature of the mould exceeds roughly 400° C.; the metal poured into the mould does not destroy the mould with known techniques because the metal immediately forms a solid shell which separates the molten metal and the sand of the mould, thus protecting the mould and preventing it from being exposed to mechanical stresses which would cause it to disintegrate. It is apparent that, with the process according to the present invention, the foundry sand mould itself is heated to the melting point of the alloy, i.e. to a temperature which exceeds its degradation temperature, even before the alloy penetrates into the mould. The mould is nevertheless capable of correctly fulfilling its function of retaining the materials and shaping the part.

The invention process can be used to produce solid parts made of abrasion-proof material.

Alternatively, the process can be adapted to produce composite parts which have a metal core covered with abrasion-proof material. In this case, before introducing the particles of hard material, at least one metal core is placed in the cavity of the mould opposite the mould walls. The melting point of said core must be higher than the temperature to which the entire assembly is subsequently heated in order to melt the alloy.

This process can advantageously be employed by using inductive heating. During inductive heating in a sand mould, the mould tends to heat up less quickly than the soldering alloy and the core which is generally metallic. As a result, the mould tends to lower the temperature of the materials with which it is in contact so that the contact surface of the part and its immediate vicinity are formed by particles of hard material which have not been subjected to an excessive rise in temperature. The particles therefore retain all their properties and do not tend to become diluted in the metallic matrix during heating.

To improve resistance to abrasion, the present invention makes provision for producing an abrasion-proof contact surface by means of a layer of composite material which contains an extremely even distribution of powder made of a hard material such as tungsten carbide. The distribution obtained must be such that the abrasion-proof contact surface obtained is the envelope of a layer that is as continuous as possible of particles of hard material which are essentially contiguous. This condition is achieved if the distribution of the hard material powder is "compact and random" to a sufficient depth of at least two or three large-particle diameters starting from the abrasion-proof contact surface. In this way, mechanical forces applied to one particle are transmitted directly to adjacent particles and forces are thus distributed.

In the case of a hard material powder which has a grain size with low dispersion, compact random distribution of the hard material powder is obtained if the volume concentration of hard material exceeds roughly 60% of the total volume. The free space between the particles is less than 40% of the total volume.

Packing or "compact random distribution" will be deemed to have been achieved after compaction obtained by vibrating the space which is filled with particles. English-speaking authors refer to "close packing". Published experimental results relate to spherical grains having essentially the same dimension.

According to the invention, allowance must nevertheless be made for a considerable "wall effect" which significantly disrupts the arrangement of the particles.

Theoretical and experimental studies published in particular by R. Ben Aïm and P. Le Goff. Powder Technol. 1 (1967/68), 281-290 demonstrate the existence of a layer which is disrupted by the wall effect. The disrupted layer is situated near the wall to a depth of roughly d/2 (where d is the average particle diameter). Beyond this zone, packing resumes a constant average value if porosity is taken into consideration. In the case of the present invention, two walls should be considered, namely the wall of the core to be hardfaced and the abrasion-proof surface which could be limited by one mould wall.

The distribution of the particles of hard material is preferably compact and random in the layer of composite material to a depth which is at least equal to six times the diameter of the largest particles in the layer of composite material. In this way, any forces applied to one particle in the abrasion-proof surface are better transmitted to particles in lower layers and are better distributed. This also reduces the disrupting wall effects mentioned above.

In this description and in the claims, the term "grain size" is used to denote the overall dimensional characteristics of powder grains, i.e. basically their average diameter or the diameter of a sphere of the same volume with each powder in principle having a grain size with a relatively low dispersion.

BRIEF DESCRIPTION OF THE DRAWINGS

Further objects, characteristics and advantages of the present invention will be apparent from the following description, reference being made to the accompanying drawings in which.

DESCRIPTION OF THE PREFERRED EMBODIMENTS

Figure 1:
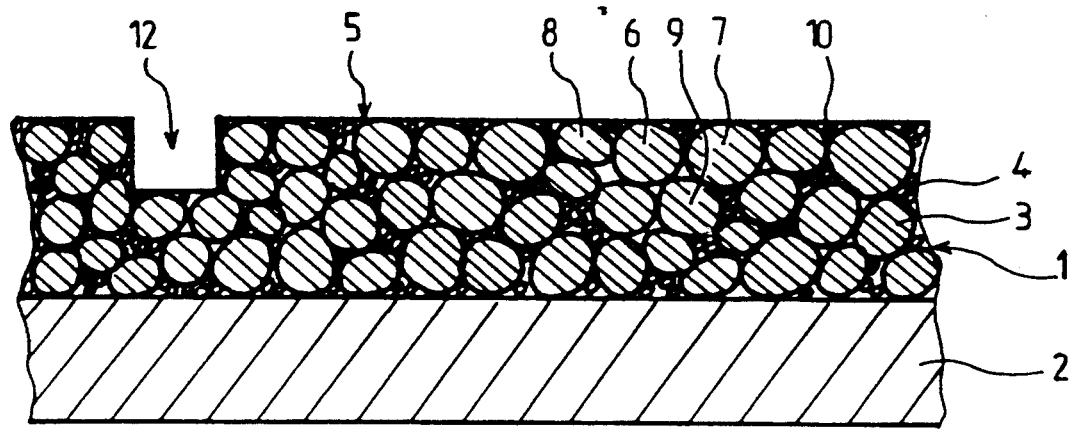
FIG. 1 shows a schematic cross-section of a mechanical part coated with a superficial abrasion-proof layer according to the present invention.

FIG. 1 shows a schematic cross-section of a part coated with a superficial abrasion-proof layer. According to the invention, superficial abrasion-proof layer 1 consists of a layer of composite material based on a powder of hard material such as melted tungsten carbide bonded in a nickel-based alloy. Layer 1 is surface welded to a metal core 2, core 2 being intended to physically secure the part. In the embodiment shown, core 2 consists of a plate-shaped blank which supports abrasion-proof layer 1.

The layer of composite material 1 has a compact random distribution of hard material powder. In the embodiment shown, the hard material powder consists of a first powder 3 made up of grains of melted tungsten carbide having a relatively large grain size and a second powder 4 consisting of tungsten carbide grains having a relatively low grain size. The grain size of the first powder is preferably selected so that the diameter of the grains on average is roughly ten times greater than that of the grains of the second powder 4. For instance, for the first powder, grains having a diameter of between 1800 and 2400 microns can be used and, for the second powder 4, grains having a diameter of between 100 and 400 microns can be used.

Precautions must be taken to ensure that, in abrasion-proof layer 1, the particles of hard material are essentially contiguous, mainly in the vicinity of surface 5 which is intended to constitute the abrasion-proof contact surface of the part. For instance, particle 6 is essentially contiguous with adjacent particles 7 and 8 and is also contiguous with the particle in lower layer 9. The particles in the outer layer such as particles 6, 7 and 8 are arranged so that they are, as far as possible, tangential to external surface 5 of layer of composite material 1 with abrasion-proof contact surface 5 forming the envelope of the continuous superficial layer of particles such as particles 6, 7 and 8. Particles such as particle 10 of the second powder 4 occupy the spaces between the grains of the first powder and the particles of the second powder 4 are also essentially contiguous with each other and in contact with the grains of the first powder.

The distribution of the particles of hard material such as particle 6 or particles 10 is preferably even in the layer of composite material to a depth of at least six times the diameter of the particles of the first powder 3. It is apparent that, in this way, the abrasion-proof properties of the surface are improved, probably because the mechanical stresses between particles are better distributed by a more compact arrangement of grains.

The particles of the first powder 3 and particles of the second powder 4 are embedded in abrasion-proof layer 1 in a metallic matrix. For instance, the metallic matrix may consist of a copper-zinc-nickel-based alloy. Other soldering type alloys can be used provided that they melt at appropriate temperatures and are capable of correctly wetting grains of hard material such as melted tungsten carbide.

Figure 2:
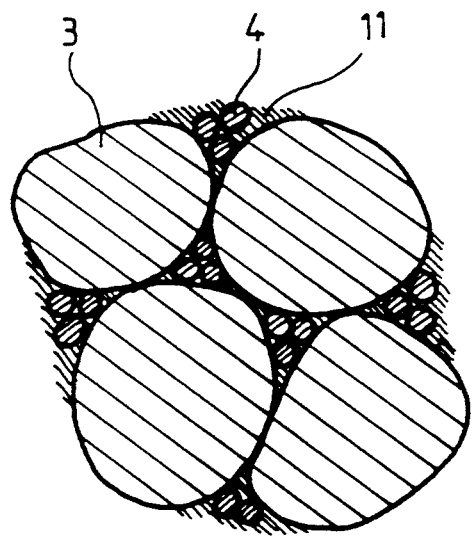
FIG. 2 schematically shows a detail view on an enlarged scale of the superficial abrasion-proof layer in FIG. 1.

FIG. 2 shows on an enlarged scale the grains of the first powder 3, the grains of the second powder 4 and alloy 11 which binds the grains.

As an example, FIG. 1 shows a surface 5 which is essentially flat and has an irregular zone 12, e.g. a groove or cavity. The surface distribution of the powder grains shall be ensured over the entire surface area 5.

The grains of the first powder 3 and the second powder 4 are preferably spheroidal particles obtained by melting, dispersing and cooling of droplets. Such spheroidal particles of tungsten carbide are produced by the present applicant for example and sold under the brand name Sphérotène.

Figure 3:
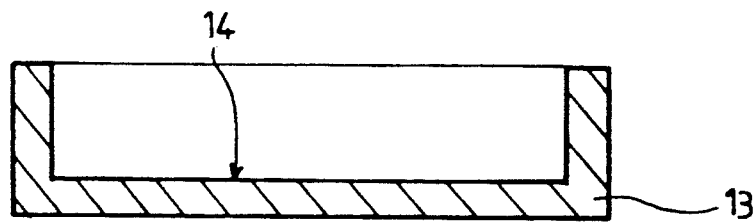
FIGS. 3 to 7 illustrate the various stages in the process for producing an abrasion-proof layer according to the present invention with an embodiment to produce a plate-shaped part.
Figure 4:
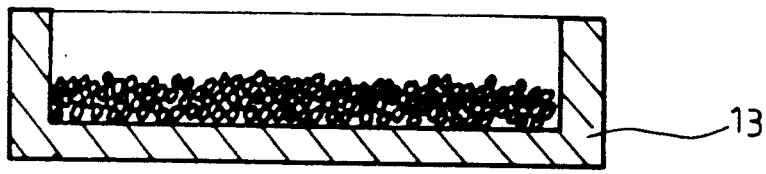
Figure 5:
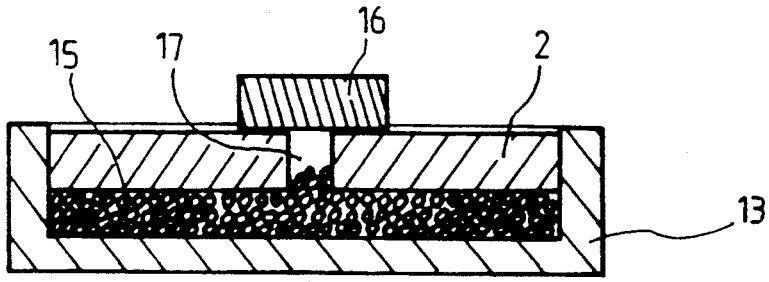
Figure 6:
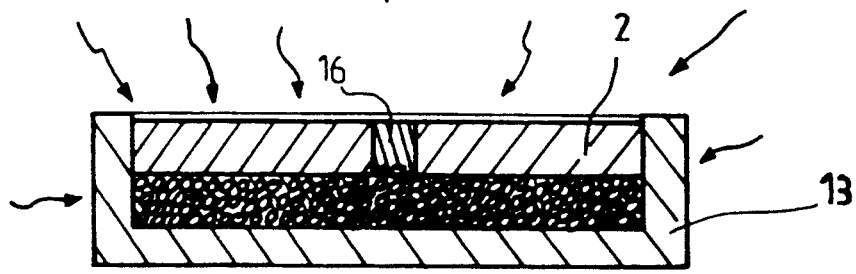
Figure 7:
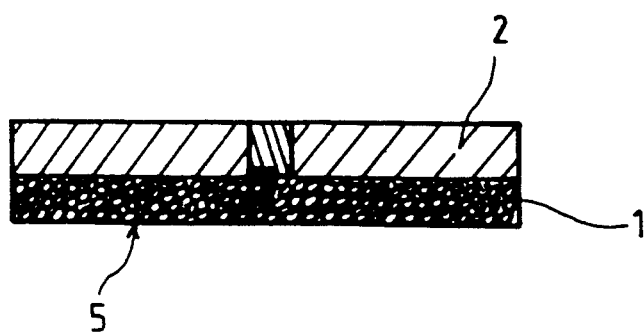

The process for producing an abrasion-proof surface according to the present invention is illustrated in FIGS. 3 to 7. This process is a kind of special moulding or duplicate moulding on a metal part which forms core 2. In the illustrated embodiment, the process involves the following main stages:

a) according to FIG. 3, a cavity mould 13 is prepared which has mould walls having the same shape as the abrasion-proof surface to be produced, e.g., the bottom 14 of the mould is shaped the same as the desired shape of the abrasion-proof surface;

b) according to FIGS. 4 and 5, core 2 is located opposite the walls of the mould and space 15 between core 2 and mould 13 is filled with grains of melted tungsten carbide or other hard material; in the case of a cavity mould 13 which forms the recipient as shown in the figures, the grains of melted tungsten carbide can initially be placed in the cavity of the mould before core 2 is placed so that it rests on the layer of grains; the entire assembly preferably being vibrated to compact the grains so that the surface grains come into as close as possible contact with wall 14 of the mould and are contiguous with each other;

c) according to FIG. 5, a sufficient quantity of an appropriate alloy 16 is prepared in a suitable solid form by employing means which ensure the subsequent distribution of the alloy during its later melting phase; for example, a block of alloy 16 is placed on core 2 and a channel 17 is provided which passes through the core and through which alloy 16 can flow in order to penetrate space 15 which contains the grains of melted tungsten carbide; the alloy being a soldering alloy capable of wetting the grains of melted tungsten carbide and core 2 and melting at a temperature which is less than the melting point of core 2 and mould 13;

d) according to FIG. 6, this part-mould-alloy assembly is heated by using a suitable method until the soldering alloy melts, infiltrates into the grains of tungsten carbide and welds to metal core 2 which is to be hardfaced: to achieve this, the assembly is heated to a temperature which exceeds the melting point of the alloy but is less than the melting point of core 2 and mould 13;

e) it is allowed to cool and the mould is stripped as shown in FIG. 7. This produces a plate which comprises core 2 and abrasion-proof layer 1.

The same infiltration process can be used without core 2.

According to the invention, the active part of mould 13 consisting of the mould surfaces is made of foundry sand bonded by resins which are commonly used in foundry technology.

If such a sand mould is used in a process where heating is achieved by magnetic inductive methods, a conventional foundry mould without external walls can be used.

In contrast, if the alloy is to be melted by placing the assembly in a traditional furnace which operates by convection and conduction, the active walls of the sand mould must then be enclosed in a moulding box having external walls made of metal or a refractory material since the external walls physically secure the mould. For example, as shown schematically in the cross-section in FIG. 9, the mould has an internal mould wall 30 made of foundry sand which is bonded by resins and a moulding box 31 made of metal or a refractory material. Moulding box 31 may be formed by assembling several plates 32 and 33 which can be separated after moulding. Internal wall 30 made of sand is sufficiently thick to form the ribs, grooves or other surface irregularities which the abrasion-proof layer to be produced must have.

After cooling, the assembly is disassembled and the sand part of the mould is usually discarded.

The mould is produced during a preliminary mould impression stage: during this stage, the moulding sand mixed with resins is prepared and, before the resins set, a pattern having the external shape of the abrasion-proof surface of the final part to be produced is applied to the mixture of sand and resins. The impression of the pattern is taken in this way and, after the resins have set, the sand mould retains the shape of the abrasion-proof surface to be produced. The pattern is removed.

Figure 8:
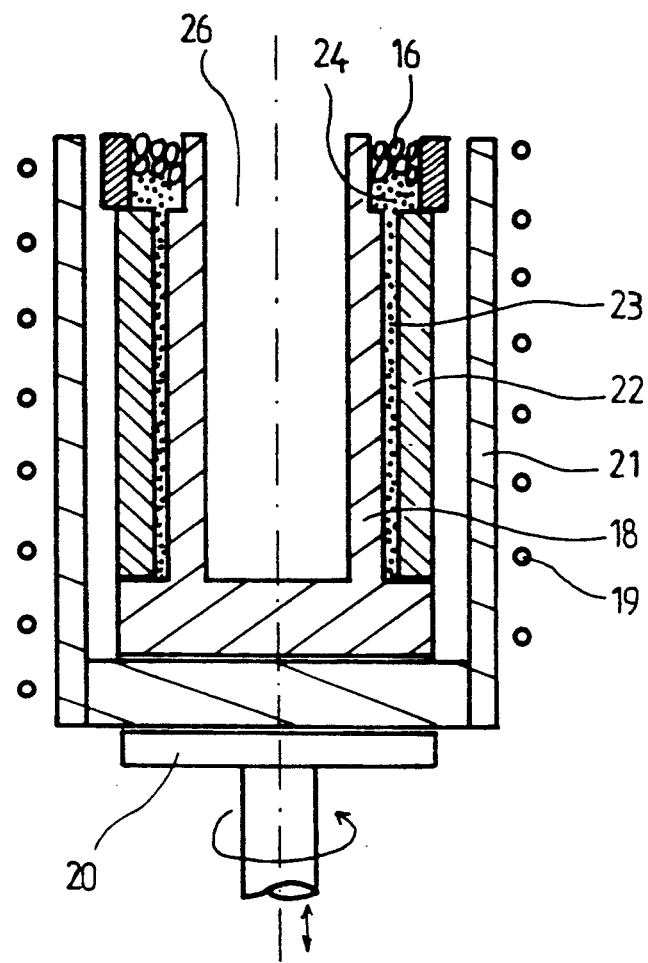
FIG. 8 schematically illustrates a process for producing a tube which has an internal abrasion-proof surface according to the present invention.

Another embodiment is illustrated in FIG. 8. This involves performing hardfacing inside a metal cylinder. In this case, the mould is a refractory tube 18 made of agglomerated foundry sand. The heating device can be an inductor 19 powered by a frequency generator which operates at 10,000 Hz for example. A stand 20 is used to rotate the assembly during heating and to vibrate it. It is advisable to provide external thermal insulation of the tube by a ceramic tube or refractory fibres 21 which limit heat losses and thus allow a faster increase in temperature. The tubular refractory mould 18 is inserted into metal tube 22 which is to be coated with the abrasion-proof layer. A space is left around the periphery of refractory mould 18 between said mould and metal tube 22. Grains of tungsten carbide are packed in space 23 between mould 18 and tube 22 and vibrated. An additional quantity 24 of carbide grains is placed in the upper part in front of the entrance to space 23. This additional quantity 24 is intended to enter space 23 when the assembly is heated to compensate for the differential expansion of metal tube 22 and mould 18. Under these conditions, it is clear that the additional quantity 24 must be compressed inside space 23 under vibration while the assembly is heated. The soldering alloy is introduced into the upper part of space 23 and is heated by inductor 19. Inductor 19 also simultaneously heats metal tube 22 which is to be coated. The interior of refractory mould 18 may be filled with an insulating refractory material 26.

The present applicant has, in particular, managed to use this method to produce internally coated tubes by depositing tungsten carbide layers 2 to 7 mm thick for the following dimensions:

outside diameter 300 mm, height 600 mm, inside diameter 260 mm, carbide thickness 6 mm;

outside diameter 30 mm, inside diameter 15 mm, height 300 mm, carbide thickness 2 mm.

In these examples, the differences between the expansion coefficients of the tungsten carbide based coating and the metal of tube 22 which is to be coated cause compression of the coating, during cooling, which increases the reliability of the process accordingly.

In certain cases, a preliminary stage may be carried out to prepare the surface of core 2, particularly the internal surface of cylindrical tube 22 which is to be coated, in order to allow correct soldering of the soldering joint. This preliminary stage involves carrying out the following operations:

grinding or shot blasting of the surface of core 2, metallisation by applying a film of nickel-chromium-boron-silicon alloy known as "self-fusing" alloy; this metallisation is obtained by using an oxy-acetylene torch fitted with a powder dispenser device or a conventional torch for flame plating with powder.

Figure 9:
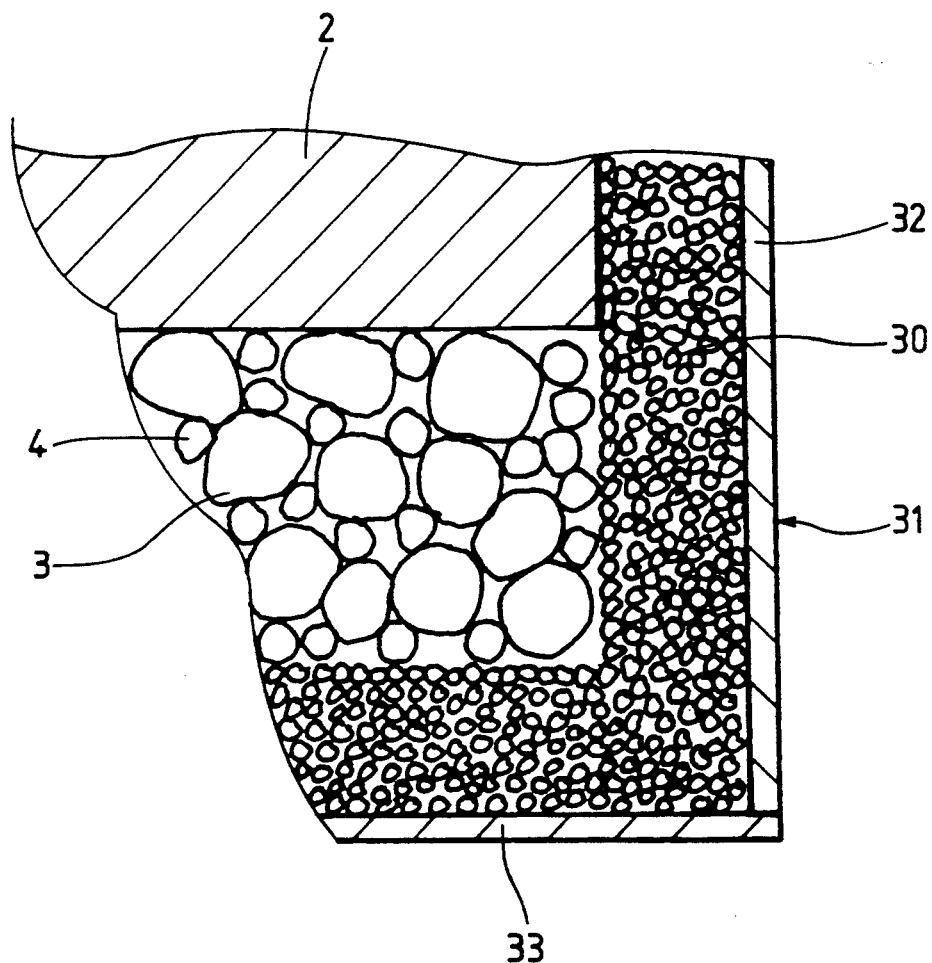
FIG. 9 illustrates on an enlarged scale the structure of the sand mould used in the process according to the invention.

The powder of melted tungsten carbide or other hard material which is used to produce the abrasion-proof surface may preferably consist of a previously homogenised mixture of two powders 3 and 4 having different grain sizes as described in connection with FIGS. 1 and 2 and as shown in FIG. 9. The powder preferably consists of grains which are mostly spheroidal and which all consist of a single material, e.g. melted tungsten carbide.

Particularly good results have been obtained by using a powder of melted tungsten carbide containing roughly 4% carbon by weight. Such a powder is actually a chemically stable compound which does not give rise to dissolution/reprecipitation of tungsten carbide in the alloy during the infiltration stage. This preserves the dimensions, compactness and metal properties of the tungsten carbide: the melted carbide itself is harder and increases the hardness of the abrasion-proof surface obtained and, consequently, its resistance to abrasion and erosion; the lack of dissolution makes it possible to select a grain size at the start of manufacture according to the desired size of grains in the final abrasion-proof surface; the lack of dissolution encourages maximum compactness because there is no rearrangement or redistribution of grains during infiltration. The stability of the compound does not necessitate fast cooling after alloy infiltration.

The grain size of the sand used to make up the mould can be different from that of the grains of tungsten carbide for the abrasion-proof surface. Nevertheless, the present applicant has observed that more consistent results and better quality surface finishes are obtained if the grains of sand which constitute inner wall 30 of mould 13 have an average diameter which is slightly less than that of the smallest grains 4 of tungsten carbide; the sand should preferably have an average grain diameter of 1 to 3 times less than the average diameter of the grains of tungsten carbide as illustrated in FIG. 9.

If there is a requirement to obtain a contact surface 5 which is particularly strong, a subsequent elimination stage involving surface treatment or polishing of surface layer 1 of the abrasion-proof material can be used. Removal of material to a depth of roughly d/2, d being the diameter of the large particles of hard material, essentially eliminates the zone in which grains are disrupted by the wall effect.

A preferred embodiment of the process according to the present invention is the production of defibration or refining plates for the manufacture of paper pulp or grinder plates for ceramic materials. The contact surface of such plates is actually shaped so that it has ribs and grooves.

In the case of grinders for ceramic materials, the production of such plates is currently achieved using conventional welding techniques and involves extremely expensive manual work.

In the case of plates for producing paper pulp, the dimensional accuracy required precludes the use of conventional welding techniques. Traditional foundry processes are currently used but these processes rule out the insertion of solid particles of hard material into the cast metal: such casting would produce completely unsatisfactory results and, in particular, a very unequal and uncontrollable distribution of grains of carbide in the abrasion-proof layer.

Traditional infiltration processes are also inappropriate because they require very expensive mould structures made of ceramic material or carbon.

Another embodiment of the process according to the present invention is the manufacture of tubes having an internal bore which includes an abrasion-proof surface. The embodiment of the process according to the present invention results in substantial cost savings in the production of such tubes and produces an extremely accurate surface finish and surface shape which cannot be obtained at reasonable cost using traditional techniques.

The present invention is not limited to the embodiments which are explicitly described and includes various variations and generalisations contained in the scope of the invention as defined in the appended claims below.

We claim:

1. A process for producing a part with an abrasion-proof surface involving the following stages:
    a) preparing a cavity mould which has mould walls having the same shape as the abrasion-proof surface to be produced,
    b) introducing particles of a hard material into the mould cavity and vibrating the assembly so that the surface particles come into as close as possible contact with the walls of the mould and are contiguous with each other,
    c) preparing a sufficient quantity of an appropriate alloy in a suitable form to ensure subsequent distribution of the alloy during its later melting phase, the alloy being a soldering alloy capable of wetting the particles of hard material and melting at a temperature which is less than the melting point of the particles of hard material and of the mould,
    d) heating the assembly to a temperature which exceeds the melting point of the alloy but is less than the melting point of the particles of hard material and of the mould,
    e) ensuring the infiltration of the molten alloy into the space filled with particles of hard materials, and
    f) allowing the assembly to cool and stripping the mould,
wherein the mould has a wall of foundry sand bonded by resins, and wherein the mould has a temperature of degradation which is less than the melting point of the alloy.

2. A process as claimed in claim 1, wherein, between stage a) and stage b), at least one metal core is placed opposite the walls of the mould, said core having a melting point which is higher than the temperature to which the assembly is heated during stage d).

3. A process as claimed in claim 1, wherein, during stage d), the assembly is heated by magnetic induction.

4. A process as claimed in claim 1, wherein:
the mould has an internal wall made of foundry sand bonded by resins, the internal wall being supported by a moulding box made of metal or a refractory material,
during stage d), the assembly is heated by a conduction and radiation furnace.

5. A process as claimed in claim 1, wherein the sand of the mould has an average grain diameter of one to three times less than the average diameter of the grains of hard material for the abrasion-proof layer.

6. A process as claimed in claim 1, wherein, during the heating stage, an additional quantity of hard material powder is introduced into the mould and vibrated in order to compensate for differential expansion.

7. A process as claimed in claim 1, wherein said process includes a preliminary stage to prepare a core intended to receive the abrasion-proof layer; this preparation stage comprising the following steps:
Grinding or shot blasting the surface,
Metallisation by applying a film of self-fusing nickel-chromium-boron-silicon type alloy using a torch.

8. A process as claimed in claim 1, wherein said process includes a preliminary mould impression stage during which the mould is prepared by taking the impression of a pattern before the resins set.

9. A process as claimed in claim 1, wherein said process involves a subsequent elimination stage by surface treatment or polishing of the zone in which grains are disrupted by the wall effect, the thickness to be removed being essentially equal to half the diameter of the large particles of hard material.

10. A process as claimed in claim wherein the main average dimension of the particles of hard material which make up the framework of the composite material is selected so that the average diameter of the large particles is less than or equal to one sixth of the total thickness of the layer of composite material.

11. A process as claimed in claim 1, wherein the powder of hard material consists of grains of melted tungsten carbide containing roughly 4% carbon by weight which make up a chemically stable compound which does not give rise to dissolution/reprecipitation of tungsten carbide in the alloy during the infiltration stage.

12. The process of claim 1, wherein the abrasion-proof surface is shaped so that it has ribs and grooves, the part consisting of a grinder plate for the ceramics industry or a defibration or refining plate for the production of paper pulp.

13. The process of claim 1, wherein the abrasion-proof surface is tubular.

14. The process of claim 13, wherein the abrasion-proof contact surface is the inner surface of a tube.

* * * * *